UNITED STATES PATENT OFFICE.

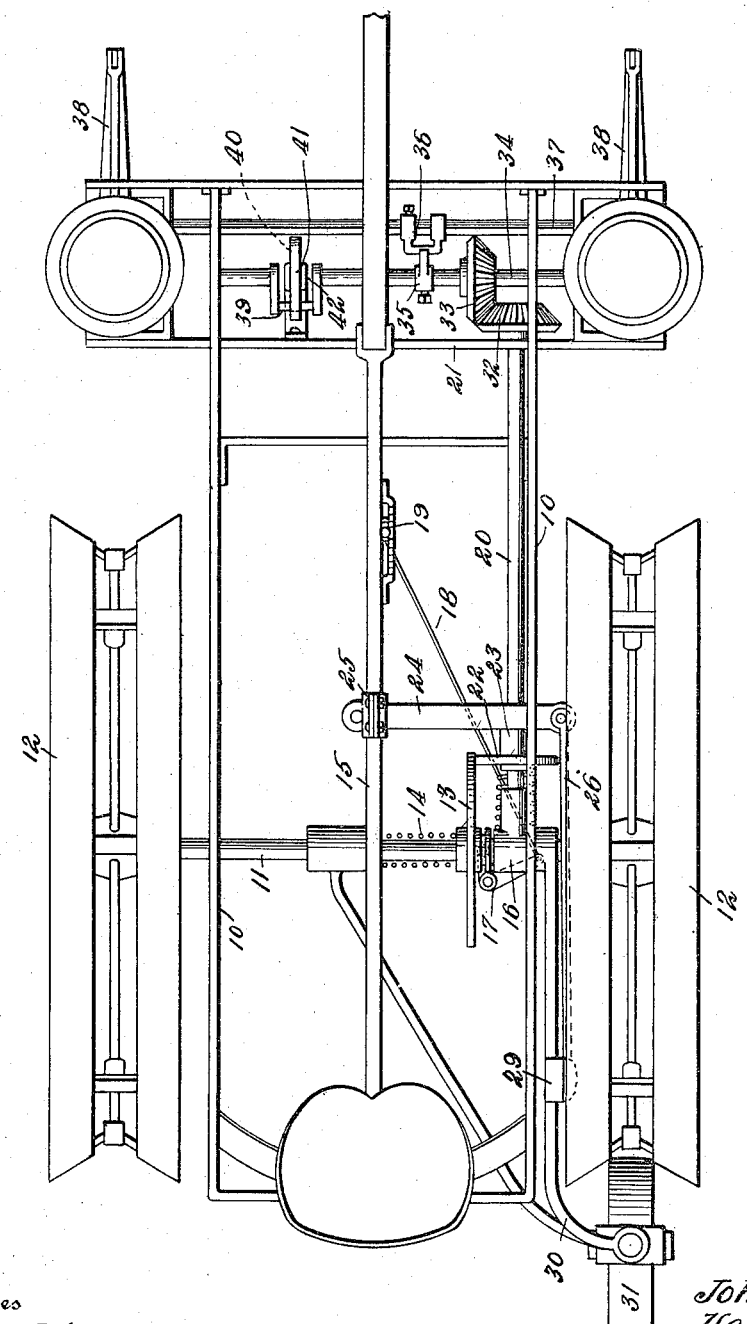

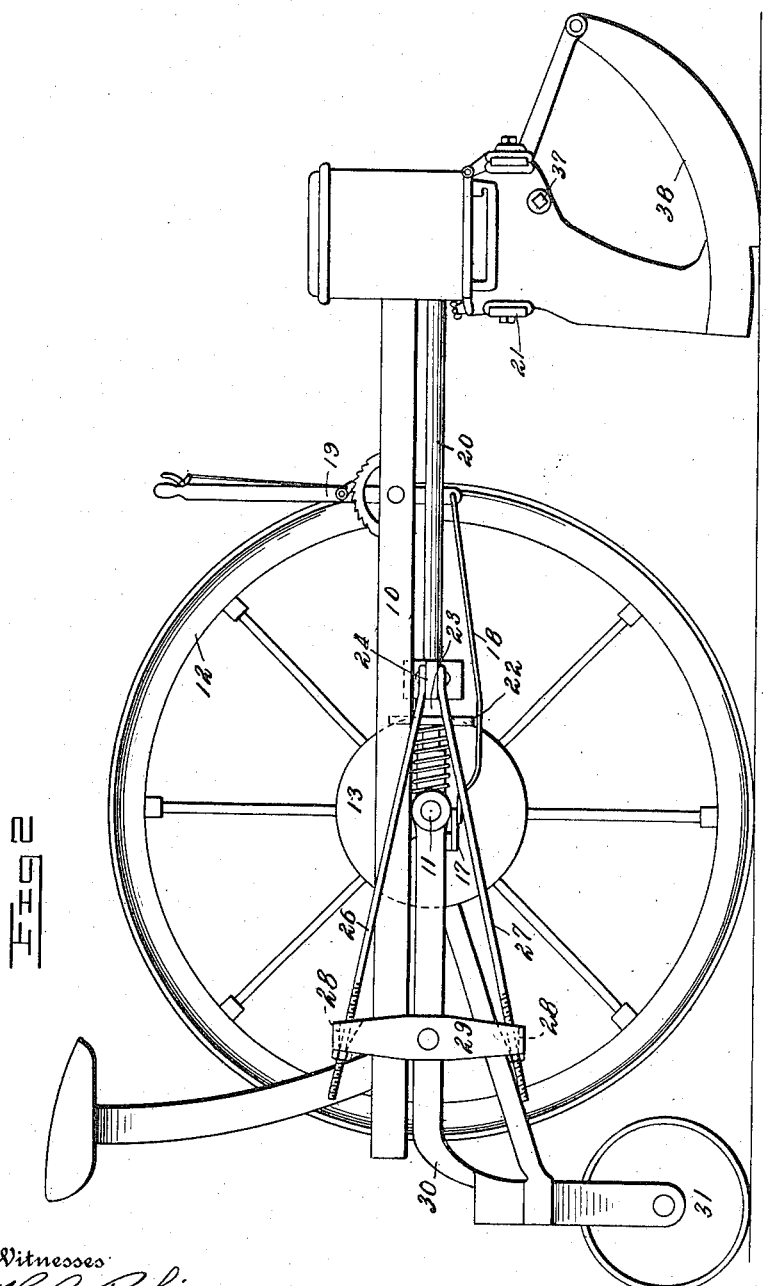

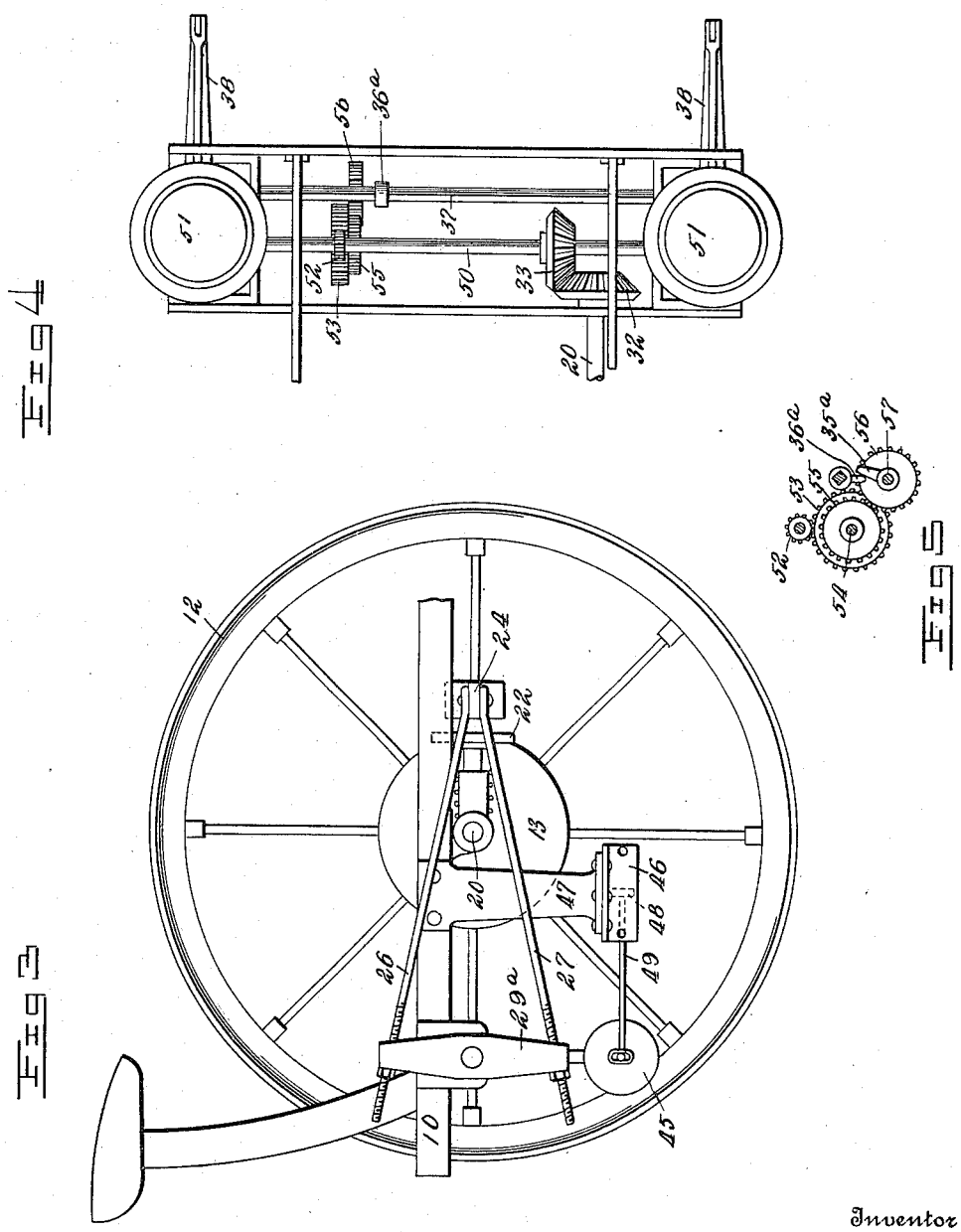

JOHN B. HARNES, OF ADVANCE, MISSOURI, ASSIGNOR OF ONE-THIRD TO LEONARD J. HARNES AND ONE-THIRD TO JOHN HENRY SCHONHOFF, BOTH OF ADVANCE, MISSOURI.

WIRELESS CHECK-ROW PLANTER.

1,209,701.  Specification of Letters Patent.  Patented Dec. 26, 1916.

Application filed July 2, 1914. Serial No. 848,593.

*To all whom it may concern:*

Be it known that I, JOHN B. HARNES, a citizen of the United States, residing at Advance, in the county of Stoddard and State of Missouri, have invented new and useful Improvements in Wireless Check-Row Planters, of which the following is a specification.

This invention relates to an improvement in check row planters, and particularly to that class of check row planters wherein attempts have been made to do away with the wire for actuating the tripping mechanism.

An object of this invention is to provide a wireless check row planter with means for actuating the tripper to release the seeds at predetermined times so as to plant the seeds at predetermined distances apart, and to provide the implement with means for controlling the tripper automatically upon the passage of the planter over uneven ground so that the seeds will be planted equi-distantly apart in a horizontal plane irrespective of the rise and fall of the ground in uneven fields. Heretofore wireless check row planters have been mechanically actuated to move the tripper at predetermined distances dependent upon the adjustment of the mechanism to drop the seeds at predetermined distances apart. However, when the implement passes up a hill or down a hill the mechanism must then be reset or adjusted to increase the surface distance between the planted seeds in order to maintain the rows equi-distantly spaced apart so as to maintain uniformity in the rows throughout the entire field. Up to the present time no mechanism has satisfactorily accomplished this result and the object of this invention is to provide a mechanism which is automatic and which is controlled by the inclination of the implement in going up or moving down a hill. This improved implement is particularly adapted to uneven, hilly or rolling land where it is almost impossible to constantly adjust the mechanism to the various inclinations of the hills and to adjust the mechanism to the proper degree to maintain the accurate horizontal spacing apart of the seeds planted.

Another object of the invention is to provide a check row planter with operating and controlling mechanism which is comparatively simple as compared with the structures now patented and now in use.

Briefly stated the invention comprises a tripper to actuate the dropping mechanism for the seed, which tripper is operated through a variable speed transmission from the traction wheels of the implement. The variable speed transmission is automatically adjusted through a mechanism controlled by the inclination of the planter frame so as to adjust the variable speed mechanism to retard or advance the operation of the tripper to release the seeds at the desired time.

The invention further aims at the provision of an improved marker and driving mechanism for actuating the seed dropping device whereby a more simplified construction is had and a construction which may be more easily controlled and adjusted.

Various other objects and advantages of this invention will be pointed out in the following description of one embodiment of this invention, the same being illustrated in the acompanying drawings wherein,—

Figure 1 is a top plan view of a conventional form of planter having the improvements of this invention applied thereto. Fig. 2 is a side elevation of the same, the near traction wheel being removed. Fig. 3 is a side elevation of the rear portion of the planter showing a modification in the improvement. Fig. 4 is a top plan view of the forward end of a planter showing a slight modification in the tripping mechanism. Fig. 5 is a detail elevational view of the gearing of Fig. 4.

Referring to these drawings wherein like parts are designated by similar characters of reference throughout the several views, and referring particularly to Figs. 1 and 2, 10 designates the frame of a planter having a transverse axle 11 upon the opposite ends of which are mounted the traction wheels 12. Within the frame 10 and upon the axle 11 is keyed a friction disk 13 yieldingly pressed toward one side of the machine by a spring 14 disclosed as of helical form and surrounding the axle 11. The inner end of the spring 14 bears against the central frame bar 15 while its outer end bears against the hub of the friction disk 13. A sleeve 16 surrounds the axle 11 outwardly of the friction disk 13, the sleeve 16 being preferably fixed to the frame 10 and having upon its inner end a vertically hinged bell-crank lever 17, one end of which is forked to engage the hub of the friction disk 13, while its opposite end is elongated and is hinged to a rod 18 extending forwardly within the frame 10 to an operating handle 19.

A shaft 20 is mounted in one side of the frame 10, has its rear end journaled in the sleeve 16, and has its forward end journaled in the forward end of the frame. The shaft 20 has keyed upon its rear end a friction wheel 22 provided with an elongated hub 23 which is connected to a horizontally swinging lever 24. The inner end of the lever 24 is hinged upon an adjustable block 25 movable longitudinally upon the central bar 15 of the frame. The outer end of the lever 24 is connected to a pair of operating rods 26 and 27 which extend backwardly and diverge to pass respectively above and below the axle 11. The rear ends of the rods 26 and 27 are threaded and pass through the forwardly flaring openings 28 in the opposite ends of a bar 29 fixed upon a frame 30 hinged upon the axle 11, and adapted for vertical movement. The frame 30 projects rearwardly and is supported at its rear end upon a caster wheel 31 adapted to ride over the ground and to rise and fall with the undulations of the surface.

The shaft 20 is provided upon its forward end with a beveled gear 32 meshing with a second beveled gear 33 fixed upon a stub shaft 34, mounted transversely in the front end of the planter. A tripper or striking arm 35 is adjustably fixed upon the stub shaft 34 in the path of an abutment 36 which is adjustably mounted upon the controlling rod 37 of the planter which effects the dropping of the seed behind the shovels 38 in the usual manner. The stub shaft 34 is provided with a crank portion 39 slidably engaging in a horizontal slot 40 in the top of a vertically movable marker 41, which latter is slidably disposed in the vertical guide 42 secured to the transverse bar 21 of the frame.

In the operation of this device the traction wheels 12 turn the axle 11 to rotate the friction disk 13. The friction disk 13 is held normally and yieldingly against the friction wheel 22 by the spring 14. By operation of the bell crank lever 17 the disk 13 may be moved inwardly away from the friction wheel 22 to thus throw the transmission mechanism out of operation. When the friction disk bears against the friction wheel 22 the shaft 20 is rotated to turn the beveled gears 32 and 33 and thus rotate the stub shaft 34. Each revolution of the stub shaft 34 brings the tripper 35 against the abutment 36 and moves the latter to rock the rod 37 to release the seeds. The marker 41 is so connected to the shaft 34 that at each dropping of the seeds the crank portion 39 of the shaft moves down and forces the marker into the earth. The crank portion after continuing its rotation immediately raises the marker 41 and holds it elevated until the tripper 35 again makes a complete revolution.

When the planter is moved over uneven ground the caster wheel 31 rises and falls and thus swings the frame 30 up and down at the back of the planter. This motion of the frame 30 carries therewith the vertical bar 29 rigid on the frame 30 and thus alternately draws the rods 26 and 27 backwardly. This movement of the rods 26 and 27 swings the lever 24 rearwardly to move the friction wheel 22 toward the hub of the friction disk 13, thus reducing the speed of rotation of the friction wheel and its shaft 20, and prolonging the interval between the striking of the tripper 35 against the abutment 36. The sleeve 16 carries a spring 43 disposed between the sleeve and the friction wheel 22 to normally urge the friction wheel outwardly to the position shown in Figs. 1 and 2. The rods 26 and 27 are each provided with a nut 44 adjustable upon the threaded extremities of the rod, and adapted for engagement with the vertical bar 29 as the same is moved to draw the rods 26 and 27 in reducing the speed of the shaft 20.

In Fig. 3 of the drawings is disclosed a modification in the structure wherein the hinged frame at the rear of the planter is done away with, and wherein the automatic controlling means for shifting the friction wheel 22 to vary the speed of the shaft 20 is in the form of a weight 45. The weight 45 is mounted upon the lower end of the bar 29$^a$, the same being pivoted to the frame 10 and adapted to be swung by the weight as the frame is tilted either forwardly or rearwardly. The swinging of the weight 45 turns the bar 29$^a$ to draw upon either the top rod 26 or the lower rod 27, as in the operation of the form shown in Fig. 1, to control the variable speed transmission gearing.

For the purpose of preventing the weight 45 from swinging under the vibration of the frame 10 when the planter is in operation, any suitable means may be employed. In Fig. 3 there is shown a dash pot 46 mounted upon the lower end of a bracket 47 extending down from the frame 10. Within the dash pot 46 a piston 48 is disposed from which projects the rod 49 having a suitable loose connection with the weight 45 admitting of the free swinging of the weight in its true circular path, while at the same time preventing any sudden swinging of the weight when the frame 10 is submitted to sudden jars as in the starting or stopping of the planter. If it is desired the shaft 20 may be connected to the mechanism for actuating the usual seed plates in the hoppers of a planter for the purpose of selecting the desired number of seeds and collecting them in position to be dropped by the tripping mechanism.

In Fig. 4 the shaft 20 is shown with the gear 32 meshing with the gear 33, the latter being mounted upon the transverse shaft 50 which extends at its opposite ends to the hoppers 51 at the opposite sides of the planter for actuating the usual seed plates and their mechanism, not shown. By this connection the operation of the seed plates may be timed or controlled automatically by the swinging caster frame or the weight 45.

In Figs. 4 and 5 there is shown a connection between the seed plate shaft 50 and the tripper rod 37 whereby the tripper rod is operated upon the turning of the seed plate shaft a predetermined number of times. The shaft 50 is provided with a pinion 52 meshing with a gear 53 located preferably beneath the shaft 50 on a stub shaft 54, the latter carrying a second gear 55 which in turn meshes with a third gear 56 mounted upon a second stub shaft 57. The shaft 57 carries the tripper 35ᵃ which is adapted to strike the abutment 36ᵃ at each revolution of the tripper whereby to release the seeds which have been dropped by the seed plate. It is of course understood that this is only one form of gearing between the seed plate shaft and the tripper rod which may be used, and furthermore the gears may be proportioned as desired to obtain the necessary ratio between the seed plate shaft 50 and the tripper rod 37.

What is claimed is—

1. In a check row planter, a pivoted member, means for actuating the pivoted member when the frame of the machine varies from the horizontal, rod connections from either end of said pivoted member, a lever pivoted at one end on the frame of the machine and connected at its other to the rod connections, and a variable speed transmission mechanism actuated by said lever.

2. In a check row planter, seed releasing means, a tripper for actuating said means, a drive shaft, a driven shaft, transmission mechanism between the tripper and the driven shaft, a variable speed mechanism between the drive shaft and the driven shaft comprising a fixed disk on the drive shaft, a second disk slidably mounted on the driven shaft and having its periphery in engagement with the face of the first disk, and a swinging frame carried by the planter and having connection with said slidable disk to move the same radially relative to said first disk and thus vary the speed of the driven shaft.

3. In a check row planter, seed releasing means, a tripper for actuating said means, a drive shaft, a driven shaft, gears between the driven shaft and the tripper, a disk on the drive shaft, a slidable disk on the driven shaft having its periphery in engagement with the face of the first disk, a member pivoted intermediate its ends, rod connections on both ends of said pivoted member, a lever pivoted to the frame of the machine and connected to the rod connections and said slidable disk, and means for actuating the pivoted member when the frame of the machine varies from a horizontal.

In testimony whereof I have hereunto set my hand in presence of two subscribing witnesses.

JOHN B. HARNES.

Witnesses:
J. J. MAWHINNEY,
GERTRUDE M. STUCKER.

Copies of this patent may be obtained for five cents each, by addressing the "Commissioner of Patents, Washington, D. C."